UNITED STATES PATENT OFFICE.

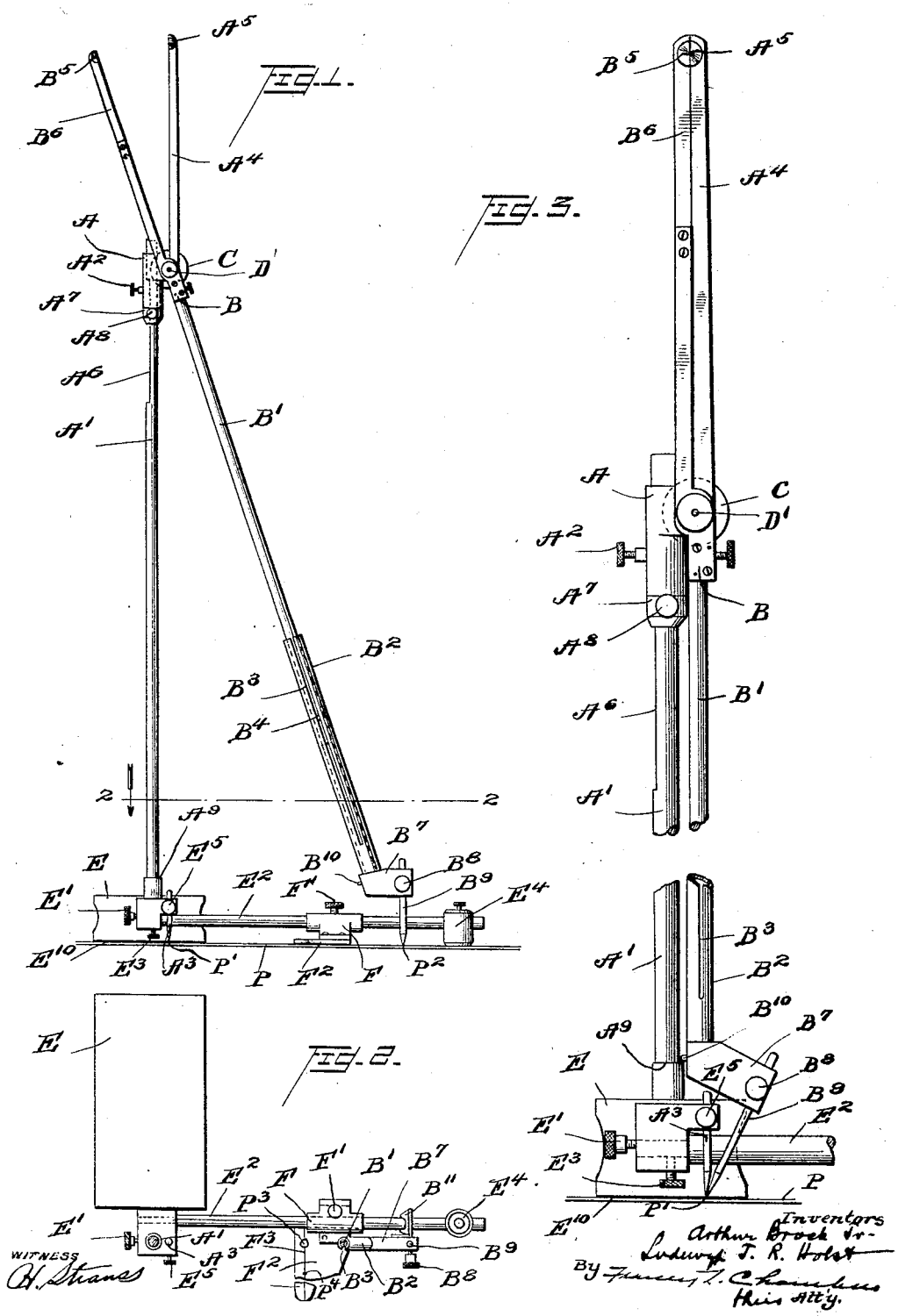

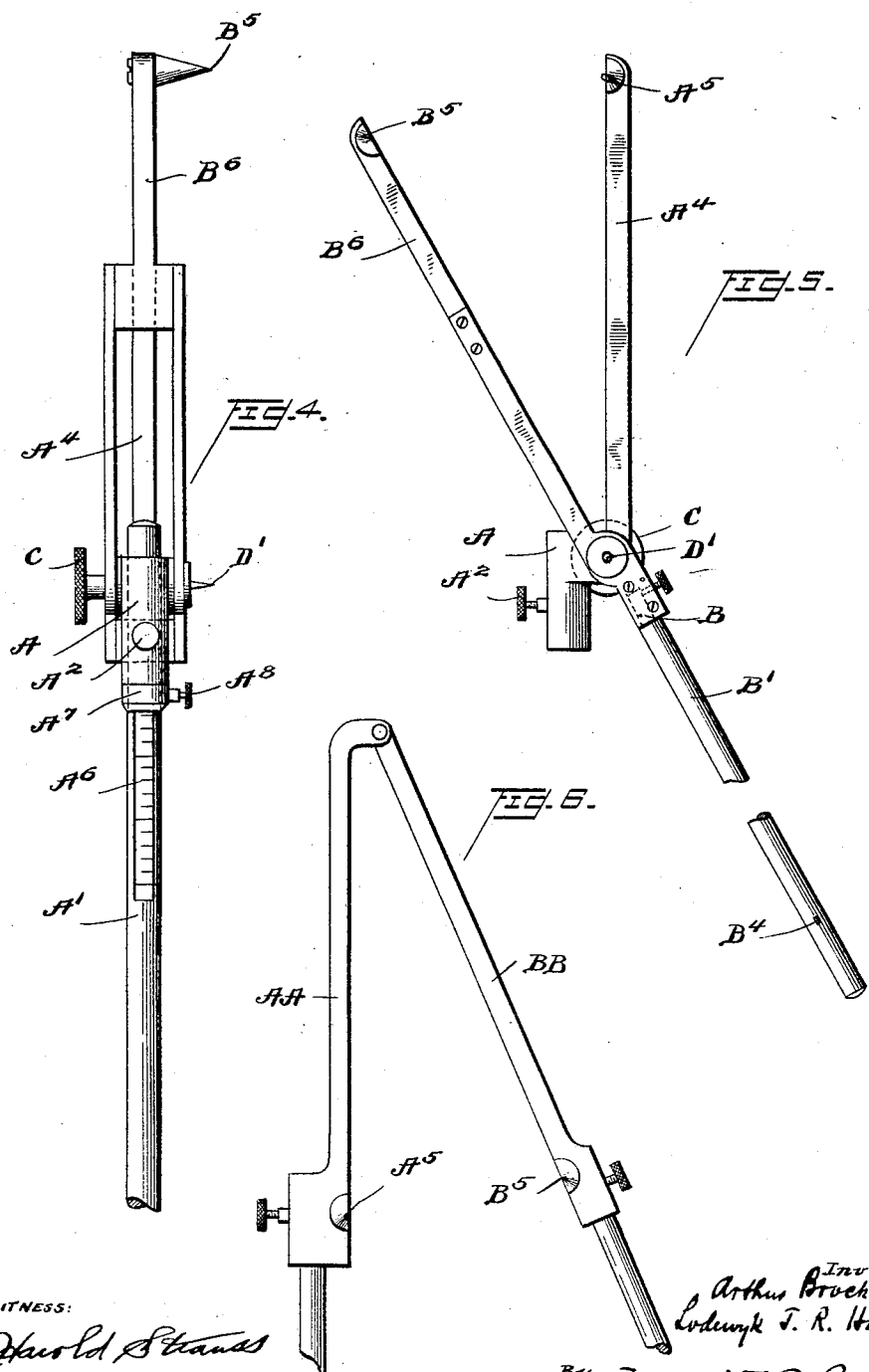

ARTHUR BROCK, JR., AND LODEWYK J. R. HOLST, OF PHILADELPHIA, PENNSYLVANIA, ASSIGNORS TO SAID BROCK, JR.

ANGLE FIXING AND TRANSPOSING DEVICE.

1,304,017.  Specification of Letters Patent.  Patented May 20, 1919.

Application filed March 22, 1917. Serial No. 156,562.

*To all whom it may concern:*

Be it known that we, ARTHUR BROCK, Jr., and LODEWYK J. R. HOLST, both citizens of the United States of America, and residing in the city and county of Philadelphia, State of Pennsylvania, have invented certain new and useful Improvements in Angle Fixing and Transposing Devices, of which the following is a true and exact description, reference being had to the accompanying drawings, which form a part thereof.

Our present invention consists of a simple and effective instrument of novel construction, and adapted for use in quickly and accurately fixing the angle between a line transverse to, and intersecting a surface at one point, and a second line intersecting the surface at a second point, and intersecting the first mentioned line at a predetermined distance from said surface, and for effecting the transposition of the angle thus fixed, as to a drawing. The instrument was particularly devised, and is especially adapted for use in making maps from photographs of the underlying terrain taken by a camera mounted on an airship or balloon, but our instrument is not necessarily limited to use for this particular purpose.

Our novel instrument, in its preferred practical form, consists essentially of a compass having one leg extensible in length, and supporting means connected with the other leg of the compass to hold that leg perpendicular to a surface engaged by said supporting means. Preferably the instrument comprises provisions for readily separating the supporting means from the compass or from so much of the latter as is necessary to enable the angle between the legs of the compass in any setting of the latter, to be conveniently laid off on a drawing or map by means of marking points carried by the detached portion of the compass.

The various features of novelty which characterize our invention are pointed out with particularity in the claims annexed to and forming a part of this specification. For a better understanding of the invention, however, and of the advantages possessed by it and specific objects attained by its use, reference should be had to the accompanying drawings and descriptive matter in which we have illustrated and described preferred embodiments of our invention.

Of the drawings:

Figure 1 is an elevation of a preferred form of our instrument in its open operative condition;

Fig. 2 is a horizontal section taken on the line 2—2 of Fig. 1;

Fig. 3 is an elevation taken similarly to Fig. 1, but on a larger scale and with parts broken away, and with the compass in its closed condition.

Fig. 4 is a partial elevation taken at right angles to Fig. 1;

Fig. 5 is an elevation of the detached angle marking portion of the compass shown in Figs. 1 to 4; and Fig. 6 is an elevation taken similarly to Fig. 1 and showing a portion of a slight modified construction.

Our instrument in the form shown in Figs. 1 to 4 inclusive, comprises a pair of compass legs A and B hinged together and provided at their hinged joint with a clamping nut C and a lateral marking point D' which is in alinement with, and may be formed by the end of the pintle of the hinge connection between the legs A and B.

The leg A, as shown, comprises a knuckle or body portion formed with a socket receiving the upper end of the rod or post A', which may be clamped to the knuckle portion by a clamping screw $A^2$. The lower end of the rod A' is secured as by a clamping screw E' in a socket formed in a supporting base member E. The latter, which is in the form of a heavy block, is provided with a socket parallel to the rod A', for a centering pin $A^3$ which is adjustably secured in place therein by a clamping screw $E^2$ and forms in effect the tip or point of the compass leg A. The compass leg A is also formed with an extension $A^4$ above its knuckle or body portion which is provided with a lateral projection or marking port $A^5$. The tip of the marking projection $A^5$, the axis of the hinge pintle D, and the pointed tip of the pin $A^3$ all lie in the same plane which is perpendicular to the plane of the surface $E^{10}$ of the supporting member E, which, in the normal use of the apparatus, rest upon the photograph P or other object on which the compass is used. The axis of the centering pin $A^3$ is coincident with the geometrical axis of length of the compass leg A.

The distance between the surface $E^{10}$ and the axis of the compass hinge pintle D of the compass must be very accurately fixed in any setting of the apparatus, although this distance may need be varied to meet different operating conditions. To permit an easy and accurate adjustment of this distance the post $A^1$ is shown as provided adjacent its upper end with a flattened portion $A^6$ on which scale markings are applied as shown in Fig. 4. To permit this distance to be adjusted the post $A'$ is provided adjacent its upper end with a flattened portion on which scale markings $A^6$ are put. A collar $A^7$ mounted on the post $A'$ and provided with a clamping screw $A^8$ by which it may be secured to the post in any desired position, has its lower end beveled so that it may coöperate with the scale markings $A^7$ to effect a very accurate adjustment or setting of the collar. The upper end of the collar forms a seat for the lower end of the knuckle or body portion of the compass leg A.

The compass leg B is formed with a rod-like portion $B'$ extending away from the knuckle or body portion of the compass leg and telescoping with the tubular lower or outer portion section $B^2$ of the compass leg. As shown, the tubular or outer telescopic section $B^2$ is formed with a slot $B^3$ receiving a projection $B^4$ from the rod $B'$, thus preventing relative rotation of the parts $B'$ and $B^2$. At its upper end the compass leg B is provided with an extension $B^6$ carrying a lateral projection $B^5$, the point of which contacts with the point of the lateral projection $A^5$ when the compass is closed, as shown in Fig. 3. The tubular portion $B^2$ of the compass leg B carries a foot-piece $B^7$ in which is adjustably secured, as by a clamping screw $B^8$, the centering pin $B^9$, which forms the point or free end of the compass leg B. The pointed lower end of the pin $B^9$ should lie in the plane including the axis of the pintle B, and a line parallel thereto, passing through the point of the marking projection $B^5$. In other words the point of the pin $B^9$ lies in the longitudinal axis of the compass leg B. To insure the proper setting of the point of the pin $B^9$ to compensate for wear or accidental misadjustment the parts are so proportioned and arranged that when the compass is closed and the points of the two marking projections $A^5$ and $B^5$ are brought together, as shown in Fig. 3, the pin $B^9$ may be adjusted to bring its pointed lower end into contact with the pointed lower end of the pin $A^3$. To facilitate this adjustment the compass leg portion $B^7$ is provided with a projection $B^{10}$ adapted to rest on a shoulder $A^9$ of the post $A'$ when the compass is closed, and thereby hold the foot portion $B^7$ of the compass leg B at the proper elevation for the adjustment of the pin $B^9$. The foot portion $B^7$ also carries a bifurcated guide $B^{11}$ which straddles a rod $E^2$ which is secured at one end to the supporting member E, as by means of the clamping screw $E^3$. The rod $E^2$ has adjustably mounted on it a small supporting member or post $E^4$ having its lower end in the plane of the surface $E^{10}$ of the support E.

Slidingly mounted on the rod $E^2$ is an arm F which may be clamped to the rod $E^2$ at any desired adjustment by the set-screw $F'$, and which comprises in the preferred construction illustrated, a transparent blade $F^2$ extending parallel and immediately above the plane of the surface $E^{10}$. This transparent blade is formed at its under side with a line $F^3$ extending perpendicularly to the line of the rod $E^2$, and is also formed with a perforation $F^4$ through which the point of the pin $B^9$ may be passed into contact with the photograph or surface beneath the blade at a point intersected by the line $F^3$.

In the contemplated mode of use of the apparatus described, the compass is put in place with the point of the pin $A^3$ against a point $P'$ of the photograph P, and with the point of the pin $B^9$ in contact with a second point $P^2$ of the photograph. To transpose the angle extending between the legs of the compass to a map, or drawing for constructing a map, the compass is manipulated to bring the marking points $D'$, $B^5$ and $A^5$ into contact with the map or drawing. This when accomplished without disturbance of the adjustment of the compass legs, marks the angle on the map or drawing. Conveniently in effecting this transposition we first adjust the clamping screw C to lock the compass legs in the setting in which the legs of the compass engage the points $P'$ and $P^2$, and then detach from the supporting means so much of the compass supporting provisions as is necessary and convenient. Ordinarily we loosen the clamping screw $A^2$ and remove the body portion of the compass leg A and the compass leg B. The parts thus removed are comparatively light and easily handled, and their removal may be effected without disturbing the setting of the compass supporting means on the photograph P, which is desirable because it is usually necessary to make several angular measurements with the point of the pin $A^3$ engaging the point $P'$ of the photograph and with the plane of the compass parallel to the line connecting the photograph points $P'$ and $P^2$. In detaching the angle marking portion of the compass it is in general, immaterial whether the section $B^2$ is kept in place on the section $B'$ or not. There is a slight practical advantage, however, in keeping the sections together when the clamping screw B⁸ is so proportioned, as it may well be, that the outer end of the screw is in the same plane with the tips of the marking points A⁵, B⁵ and D', for the screw B⁸ then assists in quickly placing the angle markings on the map or drawing at the proper points. The provision of the arm F permits of a quick and easy determination of the angular relation between the compass leg A and a line running from the compass joint to the point P³ which represents the projection onto the line connecting the points P' and P² of a point P⁴ at one side of this line. To make this determination the arm F is adjusted to make the line F³ of the transparent blade F² intersect the point P⁴, then the compass leg B is manipulated to carry the point of the pin B⁹ through the perforation F⁴ and on to the photograph at a point through which the line F³ passes. This point is the projection point P³.

The particular method of cartography which our instrument was particularly devised to carry out need not be described herein, but it may not be amiss to point out that if the point P' is the optical center of the photograph P, and the distance between the photograph and the axis of the pintle D is exactly equal to the focal length of the camera, when the compass leg A extends perpendicularly away from the point P' and the compass leg B extends to the photographic point P², the angle between the compass legs is then equal to the angle between the optical axis of the camera and the line running from the object represented in the photograph by the point P² to the camera, at the instant the picture was taken.

It will be apparent to those skilled in the art that many changes may be made in the form of the apparatus disclosed without departing from the spirit of our invention, and in Fig. 6 we have illustrated one modification of our instrument in which the compass legs AA and BB differ from the compass legs A and B of the construction first described, principally in the fact that the extension A⁴ and B⁶ of the construction first described are omitted, and the marking projections A⁵ and B⁵ are placed on the compass legs AA and BB, respectively, between the hinge connections of the compass and the free ends of the legs. This permits of a somewhat more compact form of instrument.

Those skilled in the art will also understand that certain features of our instrument may sometimes be used to advantage without a corresponding use of other features, and while we have, in accordance with the provisions of the statutes, illustrated and described the best forms of our invention now known to us, we do not wish the claims hereinafter made to be limited to the particular forms of apparatus disclosed, more than is made necessary by the terms of the claims and the prior state of the art.

Having now described our invention, what we claim as new and desire to secure by Letters Patent, is:—

1. The combination with a compass having two pivoted legs, clamping means for holding its two legs in any desired angular adjustment, and having one leg extensible in length, of supporting means connected to the other compass leg for holding the latter perpendicular to a surface engaged by said means.

2. The combination with a compass comprising pivotally connected legs and having one leg extensible in length, of supporting means connected to the other compass leg for holding the latter perpendicular to a surface engaged by said means, and a part mounted on said supporting means which extends transversely to the plane of the compass and is movable with respect to said supporting means in a direction parallel to said surface.

3. The combination with a compass comprising pivotally connected legs and having one leg extensible in length, of supporting means connected to the other compass leg for holding the latter perpendicular to a surface engaged by said means, and three laterally projecting marking elements carried by said compass, one being mounted on each compass leg and the third being coaxial with the hinge joint connecting the two legs of the compass.

4. The combination with a compass comprising pivotally connected legs and having one leg extensible in length, of supporting means connected to the other compass leg for for holding the latter perpendicular to a surface engaged by said means, and including a guide extending parallel to said surface and to the plane of the compass along which the outer end of the first mentioned compass leg is movable.

5. The combination with a compass comprising pivotally connected legs and having one leg extensible in length, of supporting means connected to the other compass leg for holding the latter perpendicular to a surface engaged by said means, and including a guide extending parallel to said surface and to the plane of the compass along which the outer end of the first mentioned compass leg is movable, and an arm extending transversely to the plane of the compass and parallel to said surface which is mounted on and movable along said guide.

6. The combination with a compass comprising pivotally connected legs and having one leg extensible in length, and the other leg adjustable in length, and including provisions for accurately fixing and securely holding the length adjustment of the leg, and supporting means connected to the last mentioned compass leg for holding the latter perpendicular to a surface engaged by said means.

7. The combination with a compass comprising pivotally connected legs and having one leg formed of telescopic sections and the other of readily separable sections or supporting means connected to the outer section of the last mentioned leg, and adapted to hold the latter perpendicular to a surface engaged by said means, and including a guide extending parallel to said surface and to the plane of the compass, and means carried by the outer telescopic section of the first mentioned compass leg engaging said guide and guiding the movement of the outer end of the first mentioned compass leg as the compass is opened and closed.

8. The combination with a base element having a flat under-surface, of a post connected to said base element and extending transversely to said surface, and forming a part of a compass leg, a centering pin mounted in said base element at one side of said post and extending perpendicularly away from said surface in alinement with the longitudinal axis of said compass leg, a second compass leg comprising telescopic parts, one of which is pivotally connected to the first mentioned compass leg, and a centering pin carried at the outer end of the other of said sections and inclined to the general direction of length of said second leg, and adjustable in the direction of its inclination, the parts being constructed and arranged to permit the points of the two centering pins to be brought together when the compass is closed and comprising means for setting the telescopic sections of the second compass leg in a predetermined telescopic adjustment when said compass is closed.

ARTHUR BROCK, Jr.
LODEWYK J. R. HOLST.

Copies of this patent may be obtained for five cents each, by addressing the "Commissioner of Patents, Washington, D. C."